(12) United States Patent
Peng

(10) Patent No.: US 10,540,672 B1
(45) Date of Patent: Jan. 21, 2020

(54) EVENT INVOLVEMENT SYSTEM AND PROCESSES FOR ACTIVELY INVOLVING FANS OR AN AUDIENCE OF AN EVENT BY EMOTIONAL ENGAGEMENT

(71) Applicant: Noel Peng, Plano, TX (US)

(72) Inventor: Noel Peng, Plano, TX (US)

( * ) Notice: Subject to any disclaimer, the term of this patent is extended or adjusted under 35 U.S.C. 154(b) by 516 days.

(21) Appl. No.: 14/866,607

(22) Filed: Sep. 25, 2015

Related U.S. Application Data

(60) Provisional application No. 62/055,265, filed on Sep. 25, 2014.

(51) Int. Cl.
  *G06Q 30/02* (2012.01)
(52) U.S. Cl.
  CPC .............................. *G06Q 30/0217* (2013.01)
(58) Field of Classification Search
  CPC .................................................. G06Q 30/0217
  USPC ............ 705/14.19; 348/143; 463/42; 725/14
  See application file for complete search history.

(56) References Cited

U.S. PATENT DOCUMENTS

| | | | | |
|---|---|---|---|---|
| 9,390,182 | B2* | 7/2016 | Nagy | G06F 17/30867 |
| 2013/0042262 | A1* | 2/2013 | Riethmueller | G06F 17/30846 |
| | | | | 725/14 |
| 2013/0260888 | A1* | 10/2013 | Thornton | A63F 13/80 |
| | | | | 463/42 |
| 2015/0062334 | A1* | 3/2015 | Dickinson | H04N 7/181 |
| | | | | 348/143 |
| 2015/0273340 | A1* | 10/2015 | Cudak | A63F 13/00 |
| | | | | 463/42 |

FOREIGN PATENT DOCUMENTS

| | | | | |
|---|---|---|---|---|
| WO | WO-2011025434 A1 * | 3/2011 | | H04W 72/1221 |

OTHER PUBLICATIONS

Alexandra Lamont, Emotion, engagement and meaning in strong experiences of music performance, 2012 (Year: 2012).*

* cited by examiner

*Primary Examiner* — Tarek Elchanti
(74) *Attorney, Agent, or Firm* — Plager Schack LLP; Mark H. Plager; Stephen Hallberg

(57) ABSTRACT

An event involvement system and processes for actively involving fans or an audience of an event by emotional engagement are disclosed. The system and processes allow for the audience/fans to become active, engaged participants and have personalized, rewarding experiences which help to build and maintain loyalty and brand. The system and processes allow audience/fans to go from passive participants to active and engaged participants in any event, thereby creating individualized, personalized, rewarding experiences and memories which help to build and maintain loyalty to the events and brand. In some embodiments, an "envy reflex" is triggered in the fans which motivates the fans to emotionally invest in the event.

11 Claims, 4 Drawing Sheets

US 10,540,672 B1

EVENT INVOLVEMENT SYSTEM AND PROCESSES FOR ACTIVELY INVOLVING FANS OR AN AUDIENCE OF AN EVENT BY EMOTIONAL ENGAGEMENT

CLAIM OF BENEFIT TO PRIOR APPLICATION

This application claims benefit to U.S. Provisional Patent Application 62/055,265, entitled "A means for the audience to become active, engaged participants and have personalized, rewarding experiences which help to build AND maintain loyalty and brand," filed Sep. 25, 2014. The U.S. Provisional Patent Application 62/055,265 is incorporated herein by reference.

BACKGROUND

Embodiments of the invention described in this specification relate generally to loyalty and active engagement systems and processes, and more particularly, to an event involvement system and processes for actively involving an audience in relation to an event to increase rewarding experiences that promote brand or event loyalty.

Many types of events, including sports events, competitions, concerts, etc., are engaged only passively by audience/fans. However, while most audiences or fans of various events are usually passive participants of the events, there is ample opportunity for individual fans, groups of fans, or entire audiences to be more actively involved. In many cases, being an active participant promotes a more individualized, personalized, and rewarding experience.

Past systems until now did not allow audience/fans to become active, engaged participants in events and to have individualized, personalized, rewarding experience which help to build and maintain loyalty and brand.

Therefore, what is needed is a way to actively engage or involve fans and audience members of an event in a way that transforms them from passive observers of the event to engaged participants of the event, to promote individualized, personalized, rewarding experiences and memories which help to build and maintain loyalty to the events and brand.

BRIEF DESCRIPTION

Some embodiments of the invention include a novel event involvement system and processes for actively involving fans or an audience of an event by emotional engagement. In some embodiments, the event involvement system includes a central processing server computing device and a plurality of data providing and data receiving computing devices. In some embodiments, the system actively engages or involve fans and audience members of an event in a way that transforms the fans and audience members from passive observers of the event to engaged participants of the event, to promote individualized, personalized, rewarding experiences and memories which help to build and maintain loyalty to the events and brand.

In some embodiments, the processes for actively involving fans or an audience of an event by emotional engagement trigger an "envy reflex" in the fans which motivates the fans to emotionally invest in the event.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
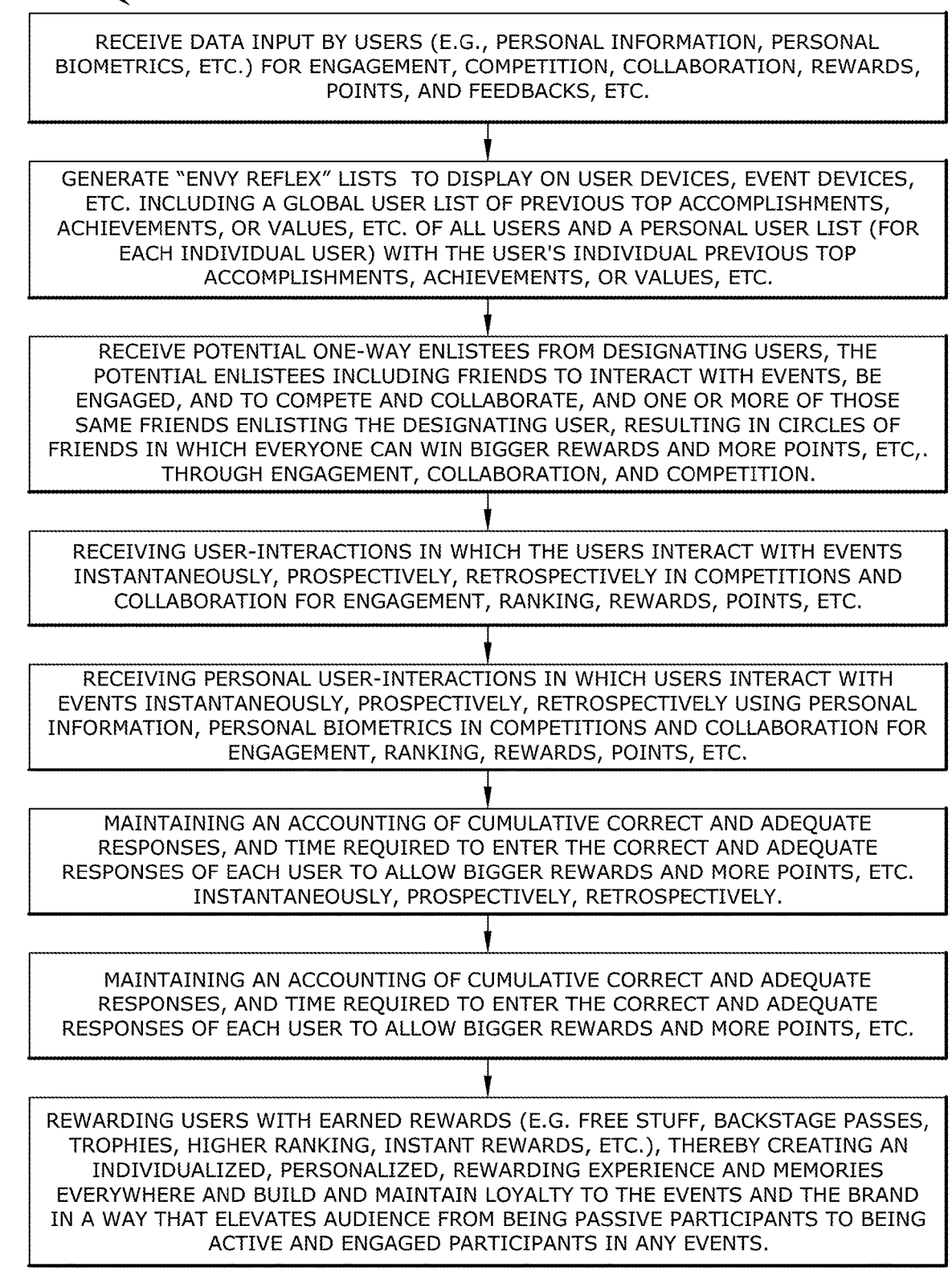
FIG. 1 conceptually illustrates a process in some embodiments for actively involving fans and audience members in an event by emotional engagement.

In the following detailed description of the invention, numerous details, examples, and embodiments of the invention are described. However, it will be clear and apparent to one skilled in the art that the invention is not limited to the embodiments set forth and that the invention can be adapted for any of several applications.

As stated above, fans and audiences (or audience members) of various events are usually passive participants of the events even though actively participating would provide a more individualized, personalized, and rewarding experience. Embodiments of the event involvement system and processes for actively involving fans and audience members in an event by emotional engagement described in this specification solve such problems by allowing audience/fans to become active, engaged participants in events, thereby creating individualized, personalized, rewarding experiences and memories and help build AND maintain loyalty and brand.

Embodiments of the event involvement system and processes described in this specification differ from and improve upon currently existing options. In particular, some embodiments of the event involvement system and processes differ because fans and/or audience members would like to be active rather than just passive participants in the events and have an individualized, personalized, rewarding experience, and event planners would like the audience to be engaged to help build AND maintain loyalty and brand. To date, there have been no such tools to accomplish these goals. The system and processes of the present disclosure fills that void.

In addition, these embodiments of the event involvement system and processes improve upon the currently existing options because the systems and techniques used in the past to up to now did not allow audience/fans to become active, engaged participants in events and to have individualized, personalized, rewarding experience which help to build AND maintain loyalty and brand. In contrast, the event involvement system and processes of this specification allow audience/fans to go from passive participants to active and engaged participants in any events, thereby creating individualized, personalized, rewarding experiences and memories which help to build AND maintain loyalty to the events and brand.

Also, the event involvement system and processes can be adapted for use in any field that requires active, engaged participants to help build AND maintain loyalty and brand either with a computer, Internet of things (IoT) devices, mobile devices, implants, physical accessory, physical machine or between machines. It can be an addition or a part of a larger system that is accessible anywhere, anytime, by everyone from families to classrooms to teams to corporations, from younger audience to older audience. In this way, the event involvement system is the ultimate motivator for the instant gratification paradigm and the "we want it now" mantra of the age.

In this specification, there are several descriptions of methods and processes that are performed by software or an "app" running on a computing device. However, it should be noted that for the purposes of the embodiments described in this specification, the word "method" is used interchangeably with the word "process". Methods performed by the software or "app" are described, therefore, by reference to example processes that conceptually illustrate process steps for actively involving fans and audience members in an event by emotional engagement.

Several more detailed embodiments are described in the sections below. Section I conceptually describes a process for actively involving fans and audience members in an event by emotional engagement. Section II describes an event involvement system. Section III describes an electronic system with which some embodiments of the invention are implemented.

I. Processes for Actively Involving Fans and Audience Members in an Event by Emotional Engagement By way of example, FIG. 1 conceptually illustrates a process 100 for actively involving fans and audience members in an event by emotional engagement. The process 100 may be implemented as software (or a "mobile app") running on a processor of a computing device (or a mobile computing/communication device, such as a smartphone). A fan or audience member may be a "user" of the computing device on which the software runs. Thus, as shown in this figure, the process 100 starts by receiving data input by users for engagement, competition, collaboration, rewards, points, and/or other such feedback. The data input can include typical user input, such as name, age, etc., as well as more personal and specific information, such as biometric data, etc.

After the user data input is received, the process 100 generates one or more "envy reflex" lists to display on user devices (e.g., mobile devices, computers, event devices and/or screens, etc.). Examples of lists which may be displayed include global user lists of top accomplished users and their respective accomplishments, achievements, values, etc., in addition to individual user lists with personal top accomplishments, achievements, values, etc., for the individual fans or audience members.

Next, the process 100 receives potential one-way enlistees from one or more designating users. Examples of potential one-way enlistees include friends to interact with in events, be engaged with, and compete with or collaborate with. In some cases, one or more of the same potential enlistees may enlist the designating user. This can result in friend groups or circles, allowing for greater chance to win bigger rewards and be more actively involved and emotionally engaged.

The process 100 then performs steps in which user interactions and/or personal user interactions are received for interacting in relation to the event. The process 100 throughout maintains an accounting of correct and/or adequate responses and times required to enter such responses (for each user). This accounting is used in providing such valued rewards, points, bonuses, etc., instantaneously, prospectively, retrospectively, etc., as well as to allow bigger rewards and more points, etc. Finally, the process 100 rewards the users with their earned rewards.

While the process 100 described above by reference to FIG. 1 demonstrates how a fan or audience member is able to become actively involved through emotional engagement (e.g., triggering the user's "envy reflex"), other processes involve a great many more details in engaging and involving users (fans, audience members, etc.) so that such users experience a feeling of active involvement, which promotes brand/event loyalty in the long run.

Figure 2:
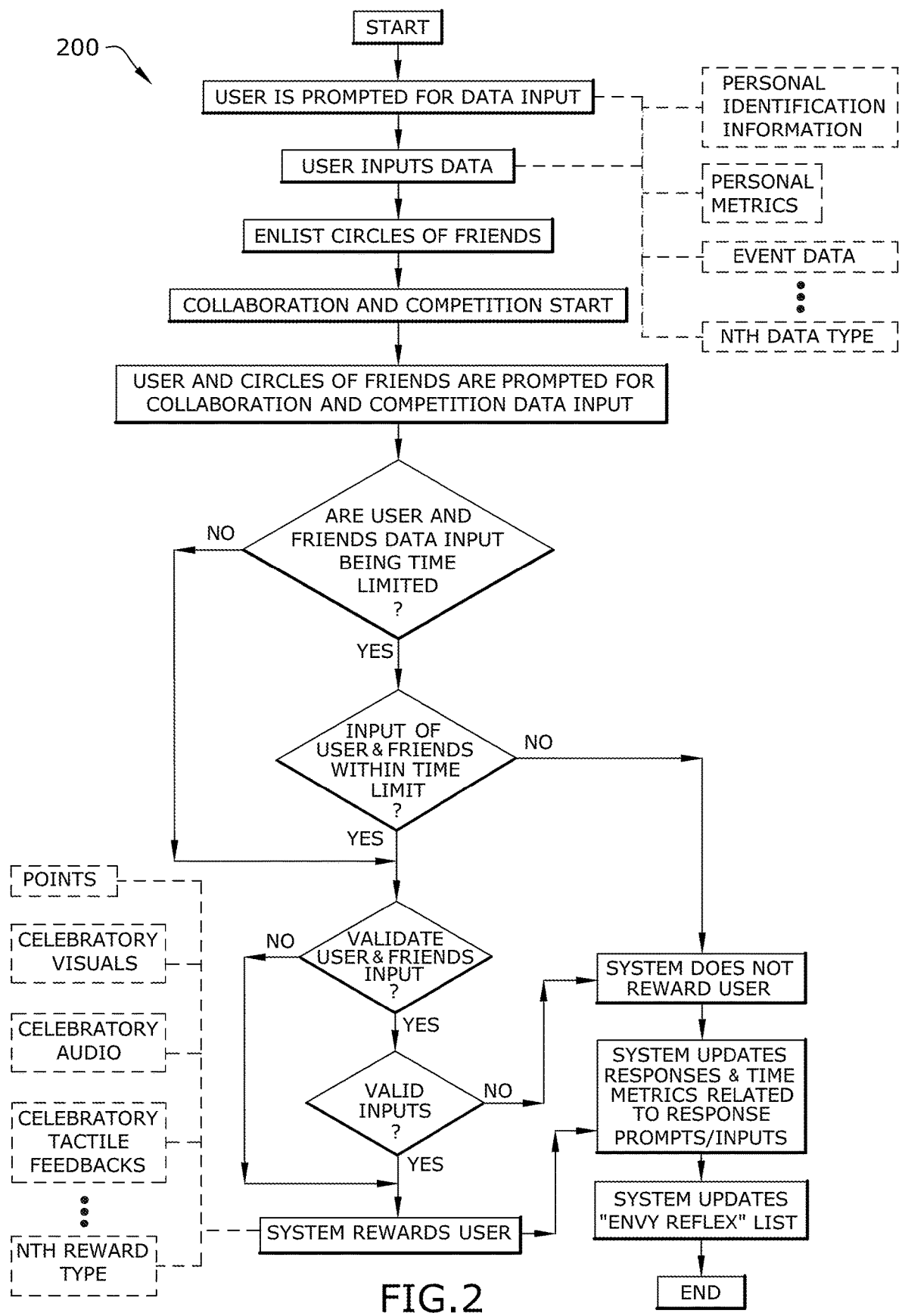
FIG. 2 conceptually illustrates a detailed process in some embodiments for actively involving fans and audience members in an event by emotional engagement.

One example of a process with such detail is described by reference to FIG. 2, which conceptually illustrates a detailed process 200 for actively involving fans and audience members in an event by emotional engagement. The process 200 may be implemented as software (or a "mobile app") running on a processor of a computing device (or a mobile computing/communication device, such as a smartphone). A fan or audience member may be a "user" of the computing device on which the software runs. Thus, as shown in this figure, the process 200 starts by prompting the user for data input, which the user then inputs. Examples of the type of data input by the user include personal identification information, personal metrics, event data, etc. This is a preliminary set of user data pertaining to an event, but prior to any competition, collaboration, or related event engagement begins.

In some embodiments, the user enlists other users to join in an event activity, competition, collaboration, etc. For example, the user may invite one or more friends to join (and those friends may, incidentally, invite the user to join in other competitions, collaborations, or related activities for the event or another event). When enlisted friends respond, the process 200 builds the user's circle or friends. It is also possible that the user has several circles of friends related to different events and competitions or collaborations.

After the user's preliminary data input is received and the circle of friends is completed, the competition or collaboration for the event begins. The process 200 starts by prompting the user and circle of friends for competition and collaboration data input. For example, a challenge may be presented to guess the next song a particular concert singer will sing next, or the process may prompt football fans (user and circle of football fan friends) to guess what the score will be at the end of each quarter. Any type of prompt is possible. Even sensor based questions/items can be used to prompt the user and circle of friends in relation to the event. For instance, a velocity sensor on a car may allow a question relating to the top speed a driver can achieve in a car race event, or a pressure sensor may allow a question relating to the impact force applied to a baseball hit by a particular baseball player. Whatever type of competition and collaboration data input is prompted for, the user and the circle of friends will then be able to input their responses.

Next, the process 200 determines whether data input of the user and the friends is time limited. When there is no time limit, the process 200 transitions to a validation stage, which is described further below. On the other hand, when the data input of the user and the friends is time limited, the process 200 then determines whether the user and the friends actually input the data within the allowed time. When the data is not input within the allowed time, the process transitions to a sequence of steps in which the system does not reward the user, the system updates the cumulative and personal accounting of responses and time metrics related to those responses, and in which the system updates "envy reflex" lists.

On the other hand, when the data is input within the allowed time, the process 200 transitions to the validation stage (as noted above). During the validation stage, the process 200 determines whether the user input is being validated. When it is validated, the process 200 determines if the present user input includes valid data. For example, the user enters a response of numbers to a prompt which requires an alphabet selection (e.g., A, B, C, or D). When the user data input is not valid, the process 200 transitions to the sequence of steps in which the system does not reward the user, the system updates the cumulative and personal accounting of responses and time metrics related to those responses, and in which the system updates "envy reflex" lists.

However, when the user data input is valid, the system rewards the user. The rewards may include one or more of points, celebratory visual feedback ("celebratory visuals"), celebratory audio feedback ("celebratory audio"), celebratory tactile feedback, etc. After the system rewards the user, the process 200 then transitions to final steps in which the system updates the cumulative and personal accounting of responses and time metrics related to those responses and the system updates the "envy reflex" lists. Then the process 200 ends.

II. Event Involvement System

Figure 3:
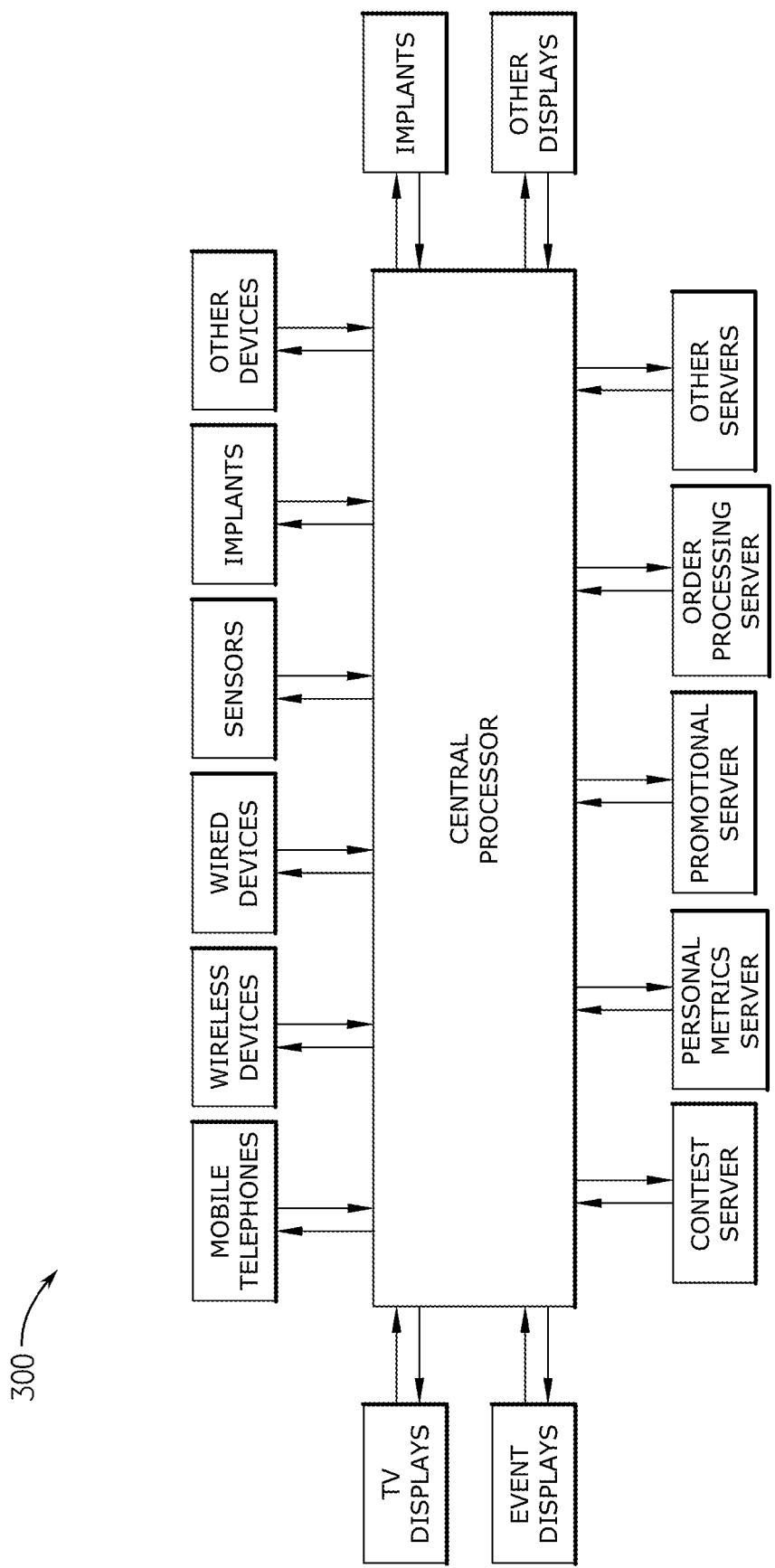
FIG. 3 conceptually illustrates a block diagram of an event involvement system in some embodiments.

FIG. 3 conceptually illustrates a block diagram of an event involvement system 300. The event involvement system may be comprised of the following elements. This list of possible constituent elements is intended to be exemplary only and it is not intended that this list be used to limit the event involvement system of the present application to just these elements. Persons having ordinary skill in the art relevant to the present disclosure may understand there to be equivalent elements that may be substituted within the present disclosure without changing the essential function or operation of the event involvement system.

As shown, the event involvement system 300 includes a central processor as a main point of data input and processing. Several individual computing devices surround the central processor and are used for input/output of data and lists which allow different users (fans and audience members) to participate more actively in an event or in relation to an event. The individual devices are shown as exemplary devices only, and it is not intended that these devices are the only devices for use with the event involvement system. Thus, the devices shown in this figure include: mobile telephones (e.g., smartphones and non-smartphones), wireless devices (e.g., tablets, laptops, personal mobile devices, etc.), wired devices (e.g., computers, etc.), sensors, implants, other devices, TV displays, event displays (e.g., jumbo-tron, etc.), other displays, contest server(s), personal metrics server(s), promotional server(s), order processing server(s), and other such servers. When data is received by the user-operated devices, the central processor performs one or more operations and may then transfer the received data or modified/changed data to one or more of the servers for back-end processing. In this way, the event involvement system 300 can perform several key functions in order to actively involve fans of an event by emotional engagement, as follows:

1. Audience/fans input individual identifiers (e.g., name, email, phone number, location, etc.)

2. Audience/fans input energy, calories, electricity, personal information, personal metrics, biological information, body signs, biometrics, biorhythms, resources, make transactions for reward, points, and feedback.

3. System lists previous top accomplishments, achievements, or values and audience/fan's own previous top accomplishments, achievements, or values to elicit 4. Enlist and designate a number of friends who will be attending the same or similar or any event (e.g., entertainment events, sporting events, theatrical events, musical events, races, stock market, recruiting, tournaments, lawsuits, same game or different games in the same or different conferences, same or similar events at the same or different venue, football and softball, etc.) to create different circles of friends. Your friends will enlist and designate you as well.

5. Enlist and designate a number of friends who will be watching but unable to attend the same or similar or any event (e.g., entertainment events, sporting events, theatrical events, musical events, races, stock market, recruiting, tournaments, lawsuits, same game or different games in the same or different conferences, same or similar events at the same or different venue, football and softball, etc.) to create another different circles of friends. Your friends will enlist and designate you as well. With different circles of friends, everyone can win bigger rewards and more points through collaboration and competition.

6. Instant reward, points, and feedback for checking in at an event early within a specified amount of time and instant reward, points, and feedback for checking out at an event later. The earlier you and your designated friends check in at an event, the bigger the reward or points and the later you check out at an event, the bigger the reward or points.

7. Instant reward, points, and feedback for guessing, selecting the correct members and the order of participants (e.g. starting lineup, cast, etc.) at an event within a specified amount of time. The more members of participants that you and your designated friends guess, select correctly at an event and in the correct order, the bigger the reward for you and your designated friends.

8. Instant reward, points, and feedback for checking out and in at each timeout or intermission within a specified amount of time. The faster you and your designated friends check out and in at each timeout or intermission, the bigger the reward and more points for you and your designated friends.

9. The methods/processes can be used to conduct contests wherein an attendee and designated friends are asked to predict the next event or events to take place or achievement of certain goals or end results (e.g., actions or movements of players or participants or machines, first down or no first down, score or no score, plays called by coaches, renditions, plots, announcements, messages, advertisements, personal info, personal metrics, biological info, body signs, biometrics, biorhythms, etc.) within a specified time and receive instant reward, points, and feedback, etc.

10. The method can be used to conduct contests wherein an attendee and designated friends are asked to predict the next end result or end results of any objects involved in any event (e.g. ball movements in a game, instruments in a concert, objects in a movie, etc.) within a specified time and receive instant reward, points, and feedback, etc.

11. The method can be used to conduct contests wherein an attendee and designated friends are asked to restate, confirm, and verify previous event or events that took place or achievement of certain goals or end results (e.g. replay results, penalties, substitutions, renditions, plots, personal info, personal metrics, biological info, body signs, biometrics, biorhythms, etc.) within a specified time and receive instant reward points, and feedback, etc.

12. The method can be used to conduct contests wherein an attendee and designated friends are asked to restate, confirm and verify the previous event or events that took place or achievement of certain goals or end results (e.g. actions or movements of players or participants or machines, first down or no first down, score or no score, plays called by coaches, renditions, plots, announcements, messages, advertisements, personal info, personal metrics, biological info, body signs, biometrics, biorhythms, etc.) within a specified time and receive instant reward points, and feedback, etc.

13. The method can be used to conduct contests wherein audience/fans and designated friends are asked to enter energy, calories, electricity, personal information, personal metrics, biological information, body signs, biometrics, biorhythms within a specified time and receive instant reward, points, and feedback, etc.

14. The method can be used to conduct contests wherein an attendee and designated friends are asked to follow instructions, directions; record, copy things, events; buy/sell, make transactions; provide resources, energy, credits, knowledge, information; measure body parameters, physiological parameters, e.g. voice recognition, cheers, decibel, thoughts, vital signs, blood oxygen saturation, alcohol levels, etc. within a specified time at and/or outside of venues and receive instant rewards, points, feedback, etc.

15. System verifies if the response is correct or not, of adequate quality and quantity or not, and if the response was made in time or not.

16. If the audience/fans and designated friends give the correct and adequate response within the specified amount of time, the audience/fans and designated friends will receive a reward instantly, e.g. points/scores/advancements, celebratory visual feedback, celebratory tactile feedback, celebratory audio feedback, etc.

17. If the audience/fans and designated friends give the incorrect and/or inadequate response or does not give the correct and adequate response in time, there is no reward.

18. System keeps track of cumulative correct and adequate responses, and time required to enter the correct and adequate responses of each spectator and designated friends to allow bigger rewards and more points, e.g. free stuff, backstage passes, trophies, etc.

19. System makes a public and private celebratory display (may include pictures) of each and every, but limited number, of top spectators with high numbers of correct and adequate responses, e.g. top 25, leader board on the jumbotron, big screen, mobile device, websites, tribunes, forums, tournaments, conventions, conferences, internet of things at each break. If there is a tie, use the faster time to correct and adequate response to break the tie.

20. The faster and more individual contests you and your designated friends win, the bigger the reward and more points for you and your designated friends. Better collaboration and competition are required to win bigger rewards and more points.

21. One of the numerous possible rewards is the opportunity to participate in online charity auctions after accumulating certain amount of points.

22. One of the numerous possible rewards is achieving higher ranking by achieving higher cumulative points.

23. Allows elaborations, commentaries, explanations, fill in the blanks, etc., on an event or events (e.g. plays, penalties, renditions, plots, notes, history, etc.), allowing audience to go from being passive participants to being active and engaged participants in such events, and thereby creating an individualized, personalized, rewarding experience everywhere and build AND maintain loyalty to the events and the brand.

The event involvement system of the present disclosure generally works like the process 100 described above by reference to FIG. 1, with the system verifying if the response is correct or not, of adequate quality and quantity or not, and if the response was made in time or not. Then, if the audience/fans and designated friends give the correct and adequate response within the specified amount of time, the audience/fans and designated friends will receive a reward instantly, e.g., points/scores/advancements, celebratory visual feedback, celebratory tactile feedback, celebratory audio feedback, etc. However, if the audience/fans and designated friends give the incorrect and/or inadequate response or does not give a response in time, there is no reward.

The system keeps track of cumulative correct and adequate responses, and time required to enter the correct and adequate responses of each spectator and designated friends to allow bigger rewards and more points, e.g. free stuff, backstage passes, trophies, etc. The system also makes a public and private celebratory display (may include pictures) of each and every, but limited number, of top spectators with high numbers of correct and adequate responses, e.g. top 25, leader board on the jumbo-tron, big screen, mobile device, websites, tribunes, forums, tournaments, conventions, conferences, IoT at each break. If there is a tie, use the faster time to correct and adequate response to break the tie.

The faster and more individual contests you and your designated friends win, the bigger the reward and more points for you and your designated friends. Thus, better collaboration and competition may be beneficial to win bigger rewards and more points.

One of the numerous possible rewards is the opportunity to participate in online charity auctions after accumulating certain amount of points. Another type of reward is achieving higher ranking by achieving higher cumulative points. Any type of reward/motivating goal can be employed or utilized by the event involvement system to get more fans or audience members actively involved and emotionally engaged in the event. The "envy reflex" of users is also triggered to promote more active involvement (with the idea being that people are motivated to keep up with their friends or achieve more than others in the relation to the event). This allows the audience to go from being passive participants to being active and engaged participants in any events, thereby creating an individualized, personalized, rewarding experience everywhere and build AND maintain loyalty to the events and the brand.

To make the event involvement system of the present disclosure, one may craft software that is able to complete the requisite tasks and provide the users with the useful tools described in this disclosure. A more detailed description of "software" is provided below, in connection with FIG. 4. Thus, a person skilled in the relevant art would appreciate that certain elements can be added or deleted but still preserve the collaboration, competition, and essence of this system. Furthermore, an enhanced visually-perceptible module could be added to aid the aurally impaired user, while enhanced audio cues could be similarly added to aid the visually impaired user. Improvements in technology, sensors, and recording devices will enhance the user experience.

To use the event involvement system of the present disclosure, the audience/fans and designated friends interact with events, every element of the events inside and outside of the events, each other, and software via inputs, outputs, collaboration, and competition. The system performs the functions noted above (15-23).

III. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
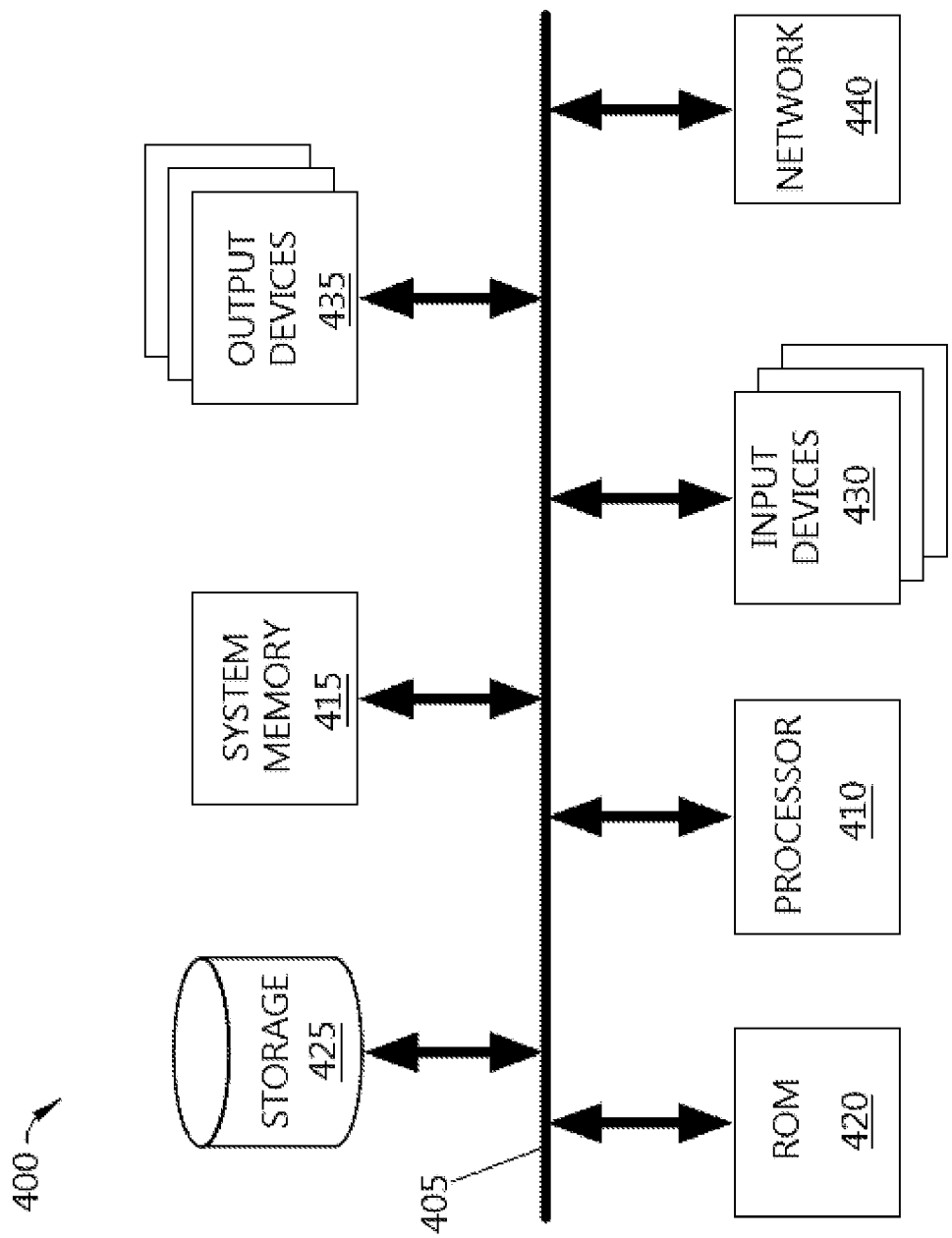
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, some of the figures conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which when executed by at least one processing unit of a computing device actively involves a user in an event by emotional engagement, said program comprising sets of instructions for:

receiving, at a central processor, a set of user data from a fan user device that is communicably connected to the central processor, said set of user data input into the fan user device by a fan user of an event;

enlisting a circle of friends of the fan user of the event, said circle of friends comprising at least one friend user;

starting a collaborative competition related to the event between the fan user and the circle of friends;

prompting, by the central processor in connection with the fan user device and a set of friend devices used by the circle of friends to engage in the collaborative competition, the fan user and the circle of friends for collaboration and competition data input related to the event;

receiving, by the central processor, collaboration and competition data input related to the event from the fan user device and the set of friend devices;

determining, by the central processor, whether the collaboration and competition data input related to the event is received from the fan user and the circle of friends within a specified time period;

when the collaboration and competition data input related to the event is received from the fan user and the circle of friends within the specified time period, determining, by the central processor, whether the collaboration and competition data input received from the fan user and the circle of friends is valid;

when the collaboration and competition data input by the fan user and the circle the friends is valid, rewarding the fan user with at least one of points, celebratory visual feedback, celebratory audio feedback, and celebratory tactile feedback and updating, by the central processor on behalf of the fan user device and the set of friend devices, an accounting of responses and time metrics at the central processor to reflect valid and timely collaboration and competition data input;

when the collaboration and competition data input by the fan user and the circle the friends is not valid, updating, by the central processor on behalf of the fan user device and the set of friend devices, the accounting of responses and time metrics at the central processor to reflect timely collaboration and competition data input that is invalid and does not result in rewarding the fan user;

updating a global user envy reflex list, by the central processor of behalf of the fan user device and the set of friend devices, and a personal user envy reflex list associated with the fan user, by the central processor on behalf of the fan user device, wherein the personal user envy reflex list associated with the fan user comprises one or more of the fan user's top accomplishments, achievements, and values;

displaying the updated personal user envy reflex list on a fan display screen of the fan user device, wherein the fan display screen is visible to the fan user; and displaying the updated global envy reflex list on the fan display screen of the fan user device and friend display screens of the set of friend devices, wherein each friend display screen is visible to a friend user in a set of friends that make up the circle of friends.

2. The non-transitory computer readable medium of claim 1, wherein the set of user data comprises at least one of personal identification information, personal metrics, and event data.

3. The non-transitory computer readable medium of claim 1, wherein the program further comprises a set of instructions for updating, by the central processor, the accounting of response and time metrics to reflect untimely response based on the set of user data input being submitted after the specified time period.

4. The non-transitory computer readable medium of claim 1, wherein the global envy reflex list comprises a listing of top accomplished users and one or more accomplishments, achievements, and values of each top accomplished user in the listing of top accomplished users.

5. The non-transitory computer readable medium of claim 1, wherein the fan user device comprises a computing device.

6. The non-transitory computer readable medium of claim 1, wherein the fan user device comprises a computing device with a sensor.

7. The non-transitory computer readable medium of claim 6, wherein the sensor comprises a velocity sensor and the event comprises a car race event, wherein the set of instructions for prompting, by the central processor in connection with the fan user device and the set of friend devices, the fan user and the circle of friends for collaboration and competition data input related to the event comprises a set of instructions for prompting, by the central processor in connection with the fan user device and the set of friend devices, the fan user and the circle of friends to provide a guess of a top car speed in the car race event.

8. The non-transitory computer readable medium of claim 6, wherein the sensor comprises a pressure sensor and the event comprises an impact sport event.

9. The non-transitory computer readable medium of claim 8, wherein the impact sport event comprises a baseball game event, wherein the set of instructions for prompting, by the central processor in connection with the fan user device and the set of friend devices, the fan user and the circle of friends for collaboration and competition data input related to the event comprises a set of instructions for prompting, by the central processor in connection with the fan user device and a set of friend devices, the fan user and the circle of friends to provide a guess of an impact force applied to a baseball hit by a baseball player during the baseball game event.

10. The non-transitory computer readable medium of claim 9, wherein the specified time period comprises a time duration between the baseball hit by the baseball player and a time at which a next baseball player is up to bat in the baseball game event.

11. The non-transitory computer readable medium of claim 1, wherein the program further comprises sets of instructions for:

receiving, at the central processor, a set of user voting poll data input from a registered voting user of a voting poll event;

recruiting a circle of friends of the registered voting user of the voting poll event, said circle of friends comprising at least one unregistered voting user;

starting a collaborative voting poll effort related to the voting poll event between the registered voting user and the circle of friends;

registering the at least one unregistered voting user;

prompting the registered voting user and the circle of friends for voting data input related to the voting poll event;

determining whether the voting data input related to the voting poll event is received from the registered voting user and the circle of friends within an open poll voting period;

when the voting data input related to the voting poll event is received from the registered voting user and the circle of friends within the open poll voting period, determining whether the voting data input is valid;

when the voting data input by the voting poll user is valid, rewarding the voting poll user with at least one of points, celebratory visual feedback, celebratory audio feedback, and celebratory tactile feedback;

when the voting data input by the voting poll user is not valid, not rewarding the voting poll user;

updating the global user envy reflex list and the personal user envy reflex list associated with the voting poll user, wherein the personal user envy reflex list associated with the voting poll user comprises one or more of the voting poll user's top voting polls;

displaying the updated personal user envy reflex list on a voting poll display screen that is visible to the voting poll user; and displaying the updated global envy reflex list on the voting poll display screen and one or more friend display screens that are visible to the circle of friends.

* * * * *